June 6, 1950
R. COVER
2,510,558
CORN CUTTING MACHINE
Filed Oct. 24, 1946
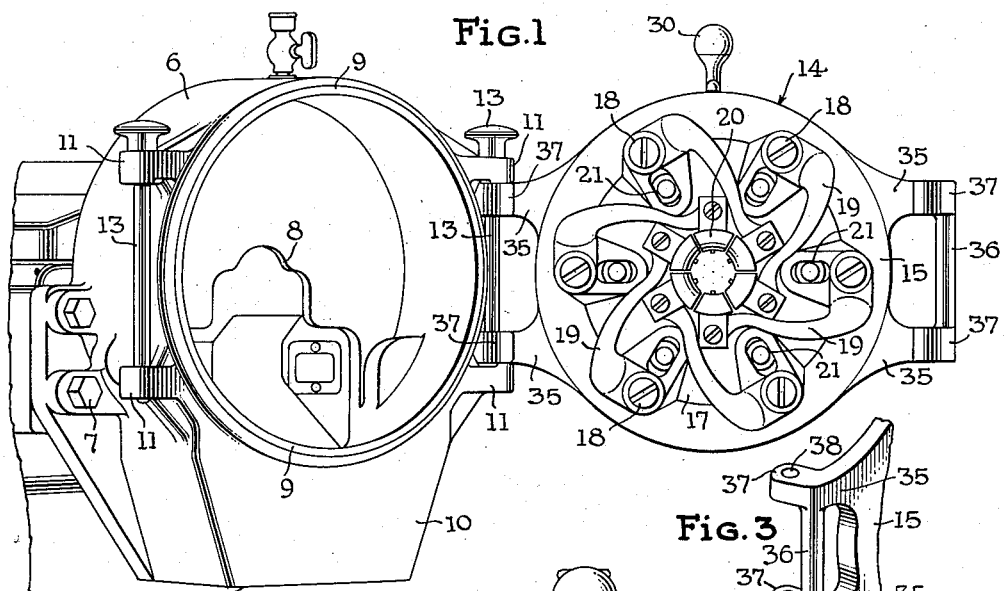
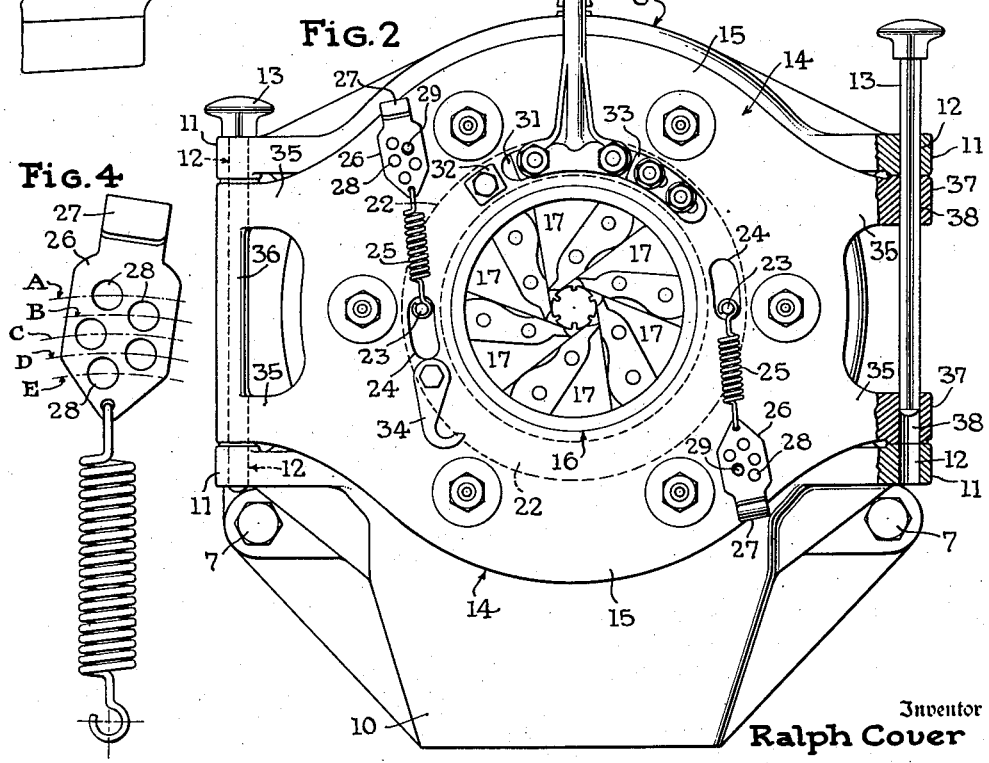
Inventor
Ralph Cover
By
Mason, Porter, Diller & Stewart
Attorneys Patented June 6, 1950

2,510,558

UNITED STATES PATENT OFFICE 2,510,558

CORN CUTTING MACHINE

Ralph Cover, Westminster, Md.

Application October 24, 1946, Serial No. 705,354

2 Claims. (Cl. 130—9)

The invention relates generally to machines for cutting green kernels from the cobs on which they are grown, and it primarily seeks to provide a novel mounting for the cutter heads employed in such machines.

An example of a cutting machine of the kind referred to is to be found in the U. S. Letters Patent 2,332,894 issued October 26, 1943 to Ralph Cover, and an example of a highly efficient cutter head adapted for use in such machines and for which the herein disclosed mounting is designed is to be found in the U. S. Letters Patent 2,216,065 issued September 24, 1940 to the said Ralph Cover.

In the corn cutting machine referred to there are included an elongated frame, a cutter head mounted at each end of the frame, two sets of corn ear clamping or holding devices mounted in longitudinal alignment adjacent the respective ends of the machine, a reciprocating pusher which is alternately forced endwise through and then withdrawn from the aligned sets of clamping devices for forcing clamped corn ears from said devices into and through the cutter heads and then withdrawing to permit insertion of succesive corn ears into said devices.

Each cutter head includes a centrally apertured head plate disposed perpendicularly with respect to the axis of reciprocation of the pusher so that the corn ears are forced through the plate apertures. A plurality of blade carriers are pivotally mounted in equidistantly spaced relation about each head plate aperture and each carries a cutter blade and also is equipped with a gage member which is contacted by the corn ears as they approach the blades in a manner for automatically positioning the blades for properly engaging and cutting the corn kernels. A circumferentially slidable ring is provided and all of the blade carriers have slot and pin connection with the ring so that upon movement of the ring in one direction all of the connected carriers will be moved outwardly, and upon movement of the ring in the opposite direction all said carriers will be moved inwardly. Spring tensioning means is provided for constantly tending to hold the ring and the blade carriers in the retracted position and the gage members and blades against corn ears being forced therethrough.

It has been the practice, heretofore, in the manufacture of machines of the character referred to to rigidly mount the cutter head units at the respective ends of the machines by use of bolts or other forms of clamping devices which required complete dismounting of a head unit whenever it was necessary to make even minor adjustment or substitution of parts, or to gain access to the ends of the frame at the position of the pusher and corn ear holder devices. This was objectionable because of the time and labor spent in such removal and replacement of head units, and also because of the danger of dropping said units and damaging the parts thereof.

Therefore, it is an object of the invention to provide a novel corn cutter head mounting which will greatly facilitate the mounting and dismounting of such units and render unnecessary complete removal of the units in many instances.

An object of the invention is to provide a novel corn cutter head mounting in which the cutter head is swingable into and out of its operative position at the end of the machine frame and is secured in operative position by a readily removable slip pin.

Another object of the invention is to provide in a machine of the character stated a mounting head having an opening through which the corn ears are pushed by the reciprocating pusher and mounting ear means disposed at each side of said opening, a cutter head unit mountable over said opening and including a head plate having mounting ear means at each side thereof and disposed for cooperation with the mounting ear means of the mounting head, each cooperating set of the cutter head and mounting head mounting ear means having uprightly aligned fulcrum pin receiving apertures therein, and a fulcrum pin removably mounted in the apertures of each said mounting ear set so that upon removal of one or the other of said pins the cutter head can be swung away from the mounting head about the other of said pins.

Another object of the invention is to provide in an improved machine structure of the character stated novel means for quickly and conveniently varying the tension in the spring means tending constantly to urge the cutter blade carriers and gage members inwardly.

Another object of the invention is to provide a tension adjustment of the character stated including a tension spring anchored at one end on the slidable ring and having a finger hook plate attached to the other end thereof and provided with a plurality of selective apertures therein each spaced a different distance from the spring anchor, said apertures being selectively placeable over an anchor pin projecting from the head plate.

With the above and other objects in view that will hereinafter appear, the nature of the invention will be more clearly understood by reference to the following detailed description, the appended claims, and the several views illustrated in the accompanying drawings.

In the drawing:

Figure 1 is a perspective view illustrating one end portion of a corn cutting machine including the improved cutter head mounting.

Figure 2 is an end elevation, parts being broken away and in section to clearly illustrate the partial removal of one of the fulcrum pins.

Figure 3 is a fragmentary perspective view illustrating one side of the head plate of the cutter head unit.

Figure 4 is an enlarged detail face view of one of the tensioning devices.

In the example of embodiment of the invention herein disclosed, one end of the elongated frame of a corn cutting machine is indicated at 5, and 6 designates the mounting head which is secured to said frame end as at 7. The mounting head 6 includes a central opening 8 through which the corn ears are thrust by the reciprocating pusher (not shown), and at its end is equipped with an annular seat 9 against which the cutter head is adapted to abut in position for having the kernels cut from the corn ears fall through the discharge throat 10 of said head 6.

From each side of the mounting head 6, a set of mounting ears 11 projects in a lateral direction. It will be apparent by reference to Figure 2 of the drawings that the ears 11 project from the head in parallel, vertically spaced relation, and said ears are provided with vertically aligned apertures 12 for receiving removable fulcrum pins 13.

The cutter head unit generally designated 14 includes a head plate 15 having a central opening 16 through which the corn cobs may pass after they have had the kernels cut therefrom. A plurality of cutter blade carriers 17 are mounted on the plate on equidistantly spaced pivots 18, and said carriers have arm extensions 19, each of which is equipped with a gage member 20 at its free end. The blade carrier and gage arm units are slot and pin connected as at 21 with a circumferentially slidable ring 22 so that upon movement of the ring in one direction, all of the connected blade carrier and gage units will be moved outwardly, and upon movement of the ring in the opposite direction all said units will be moved inwardly.

Anchor pins 23 project from the ring 22 through arcuate slots 24 formed in the head plate 15 and said pins form anchors for the tension springs 25, two such pins and springs being clearly illustrated in Figure 2. At their other ends, the springs are connected to finger hook plates generally designated 26. Each of said plates has the end thereof which is remote from the spring attachment equipped with a finger hook 27, and its flat body portion is equipped with a plurality of selective anchor apertures 28 which are selectively engageable over anchor pins 29 projecting from the head plate 15 in the manner clearly illustrated in Figure 2.

It will be apparent by reference to Figure 4 that the apertures 28 of each of the finger hook plates are so arranged that each thereof is placed a different distance from the center of the cooperating anchor pin 23. This distinct distance spacing of the apertures is clearly indicated in Figure 4 by the dot and dash lines A, B, C, D and E.

A handle 30 is connected with the circumferentially slidable ring 22 through an arcuate slot 31 formed in the head plate 15, and the portion of the handle connected with said ring operates between a fixed stop 32 and an adjustable stop 33 positioned on said head plate. It is to be understood that as the handle 30 is moved to the left as viewed in Figure 2, the shifting of the ring 22 will act through the slot and pin connections 21 to force the corn cutting blade and the gage members 20 apart. It will also be apparent that the selectively anchored springs 25 constantly tend to force the blades and gage members inwardly and to hold said elements in contact with the corn ears when they are passing through the cutter head.

By inserting a finger under the plate hooks 27, it is possible to quickly adjust the tension of the springs 25 to suit the desired operating conditions. Should it be desired to shift the handle 30 to the left as viewed in Figure 2 and hold the cutter blades and gage members in the spaced apart condition this can be readily accomplished by swinging the hook retainer 34 over the adjacent anchor pin 23, after which the handle 30 can be released.

At each side of the head plate 15 is provided with two horizontally and laterally extended arms 35, and said arms may be joined by a vertical connector 36, if desired, in the manner clearly illustrated in Figures 1, 2 and 3 of the drawings. Each of the arms 35 is extended endwise in the manner clearly illustrated in Figure 3 to provide a mounting ear 37, and the ears of each set of mounting ears 37 are arranged in parallel, vertically spaced relation for cooperating with the previously described mounting ears 11 in the manner clearly illustrated in Figures 1 and 2. The ears 37 have vertically aligned apertures 38 for receiving the readily removable fulcrum pins 13.

When it is desired to mount the cutter head, both fulcrum pins 13 are removed and the apertures of the cooperating mounting ear sets 11 and 37 are brought into registry. This placement of the parts is facilitated by placement of the head plate 15 against the seat 9 with the mounting ears 37 between the upper and lower mounting ears 11. By now inserting the fulcrum pins 13 through the registering apertures 12 and 38, the mounting of the cutter head 14 is completed.

Whenever it is desired to inspect the interior of the mounting head 6, or to make adjustments or substitutions of the cutter head parts, it is possible to remove one or the other of the fulcrum pins 13 and to merely swing the cutter head 14 about the remaining fulcrum pin in the manner clearly illustrated in Figure 1. In this manner, it is unnecessary for an operator to completely remove the cutter head or to support the weight thereof in moving the same away from the open end of the mounting head 6. It will also be apparent by reference to Figure 1 that by reason of the particular arrangement of the mounting ears 11 and 37, the cutter head 14 may be swung clear so as to entirely avoid obstruction of the open end of the mounting head 6.

While one form of the invention has been shown for purposes of illustration, it is to be clearly understood that various changes in the details of construction and arrangement of parts may be made without departing from the spirit and scope of the invention as defined in the appended claims.

I claim:

1. In a corn cutting machine, a mounting head having an opening through which corn ears are to be fed and mounting ear means disposed at each side of said opening, a cutter head unit mountable over said opening and including a head plate having mounting ear means at each side thereof and disposed for cooperation with the mounting ear means of the mounting head, each cooperating set of the head plate and mounting head mounting ear means having uprightly aligned fulcrum pin receiving apertures, and a fulcrum pin removably mounted in the apertures of each said mounting ear set so that upon removal of one or the other of said pins the cutter head can be swung away from the mounting head about the other of said pins.

2. Cutter head mounting means as defined in claim 1 in which the mounting head includes an annular seat against which the cutter head unit head plate engages in the operative position of said head unit, and in which the mounting ear means of the head plate are extended in a direction parallel the axis of and at opposite sides of said seat so that when the cutter unit is swung away in one direction or the other the head plate will be placed well away from any position of obstruction with respect to all portions of said seat.

RALPH COVER.

REFERENCES CITED

The following references are of record in the file of this patent:

UNITED STATES PATENTS

| Number | Name | Date |
|---|---|---|
| 103,543 | Barker | May 31, 1870 |
| 243,829 | Barker | July 5, 1881 |
| 708,966 | Meyer | Sept. 9, 1902 |
| 1,519,241 | Daniel | Dec. 16, 1924 |
| 1,573,579 | Ross | Feb. 16, 1926 |
| 1,589,697 | Howd | June 22, 1926 |
| 1,667,362 | Van der Vliet | Apr. 24, 1928 |
| 2,216,065 | Cover | Sept. 24, 1940 |
| 2,273,455 | Whitman | Feb. 17, 1942 |